Figure 1:
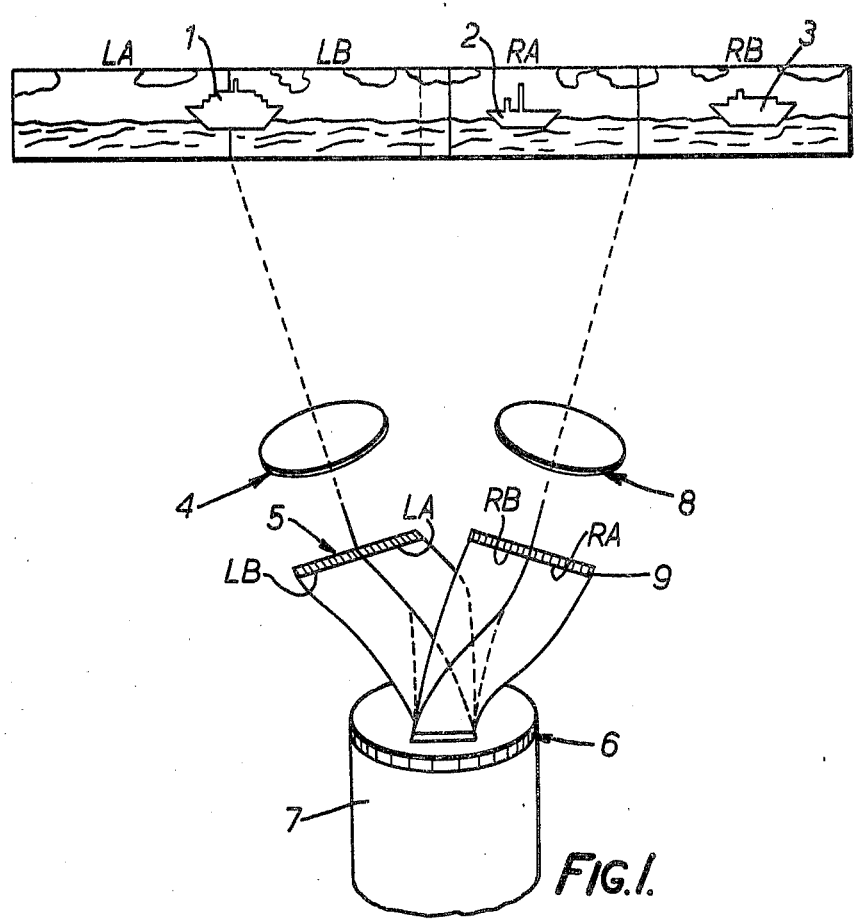

United States Patent [19]

Hunter

[11] 4,152,724
[45] May 1, 1979

[54] MISSILE GUIDANCE SYSTEMS

[75] Inventor: Ian Hunter, Chelmsford, England

[73] Assignee: Elliott Brothers (London) Limited, Chelmsford, England

[21] Appl. No.: 682,783

[22] Filed: May 3, 1976

[30] Foreign Application Priority Data

May 21, 1975 [GB] United Kingdom ............... 21928/75
Jan. 29, 1976 [GB] United Kingdom ................. 3580/76

[51] Int. Cl.² .............................................. H04N 9/04
[52] U.S. Cl. .................................... 358/109; 358/87;
358/901; 358/200
[58] Field of Search ................. 358/87, 103, 108, 109,
358/200, 226, 901, 107; 244/3.10, 3.11, 3.16,
3.17; 235/61.5 R, 61.5 S

[56] References Cited

U.S. PATENT DOCUMENTS 3,294,903 /0000 Goldmark ............................ 358/109
3,560,642 2/1971 Schroader ............................ 358/109

Primary Examiner—Robert L. Griffin
Assistant Examiner—Edward L. Coles
Attorney, Agent, or Firm—Diller, Ramik & Wight

[57] ABSTRACT

A missile guidance system uses a television system for viewing targets, and is primarily intended for sea craft. Sectors of the horizon view are displayed one above the other on a television display. Individual sectors can be magnified as required.

27 Claims, 11 Drawing Figures

U.S. Patent   May 1, 1979   4,152,724

MISSILE GUIDANCE SYSTEMS

This invention relates to missile guidance systems and in particular to television missile guidance systems wherein television picture signals developed at the missile are relayed to a base station (which may itself be mobile) for utilisation to provide a picture which may be viewed by an observer or missile controller.

In some cases the television picture reproduced at the base station is utilised to enable a controller to guide the missile right up the point of contact with a chosen target. In other cases, the controller manually controls the missile up to an aiming point from which point automatic guidance is utilised to direct the missile at a selected target.

The present invention seeks to provide improved such systems.

According to this invention a television missile guidance system is provided wherein a plurality of different fields of view in the horizontal plane are combined to provide in a television display for an observer or missile controller, a corresponding plurality of views, one above another.

In one embodiment of the invention four fields of view are provided in which case preferably two fields of view originate from one side of the missile and two from the other. Preferably the fields of view are contiguous except for the two inner fields of view originating from opposite sides of the missile which two inner fields of view overlap each other.

Preferably again each field of view subtends an angle of between 10° and 20° in the horizontal plane and approximately 2° in the vertical plane.

Preferably said two inner fields of view overlap each other by at least one half of a degree. Normally the overlap is one half to one degree, but greater overlap may be provided if desired.

Preferably means are provided at said missile for imaging said fields of view one above another on a screen and a single television camera tube is provided to view said screen to develop picture signals for transmission from the missile to the base station.

Preferably said imaging means comprises two bifurcated fibre optic bundles, the first arranged to collect the two views side by side from one side of the missile and the second arranged to collect the two views side by side from the other side of the missile and both arranged to reproduce said views one above another on a fibre optic face plate forming said screen viewed by said camera tube.

Preferably the fields of view on each side of the missile are provided by a lens system in the image plane of which is arranged the collecting ends of the respectively fibre optic bundles.

Preferably said lens systems are situated behind suppressed windows provided in either side of the nose of the missile.

Means may be provided for providing an enlarged image of part of the display, selectable for example when a target has been chosen. Such means may be optical, or electronic. For example, said means may be such as to increase the scale of the television display over a selected portion thereof or said means may be such as to effect a reduction in the field of view to provide a telescopic effect thereby effectively enlarging the image of the chosen target.

In a modification of the invention a further, relatively narrow field of view in a direction aligned with the axis of said missile is combined with said plurality of different fields of view to provide in said television display, adjacent said first mentioned plurality of views, a view of the scene directly ahead of the missile and within said narrow field of view.

Preferably said last mentioned view, as displayed, is magnified compared with said first mentioned plurality of views and preferably said last mentioned view is displayed beneath said first mentioned plurality of views.

Typically said relatively narrow field of view subtends an angle of 2½° in the horizonal plane.

Where means are provided at said missile for imaging said first mentioned fields of view one above another on a screen and a single television camera tube is provided to view said screen to develop picture signals for transmission from the missile to the base station said relatively narrow field of view will normally be imaged on said screen below said first mentioned fields of view.

Preferably again a fibre optic bundle is utilised to collect light from a centrally disposed lens system providing said relatively narrow field of view and transmit said collected light to said screen. Preferably said last mentioned lens system is provided to have a telescopic effect.

Figure 2:
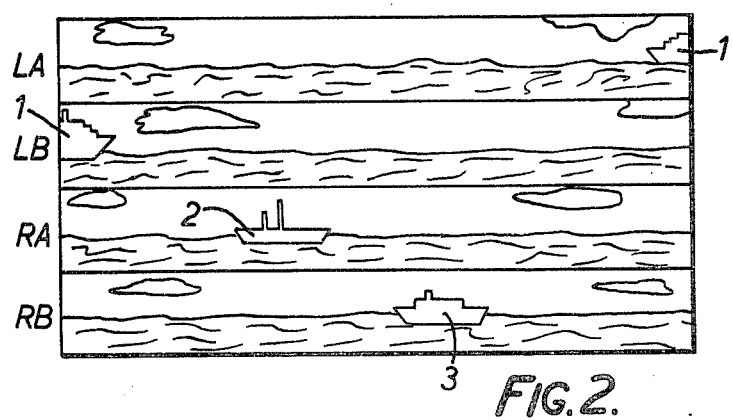
Figure 3B:
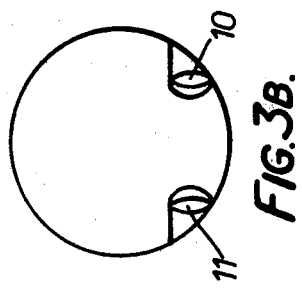
Figure 3A:
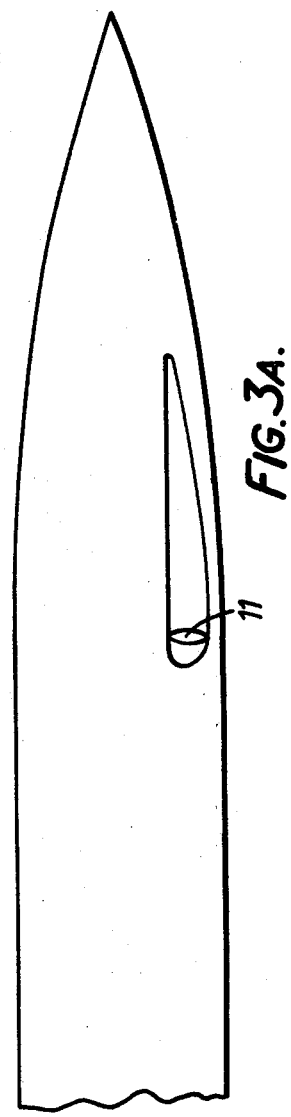
Figure 3C:
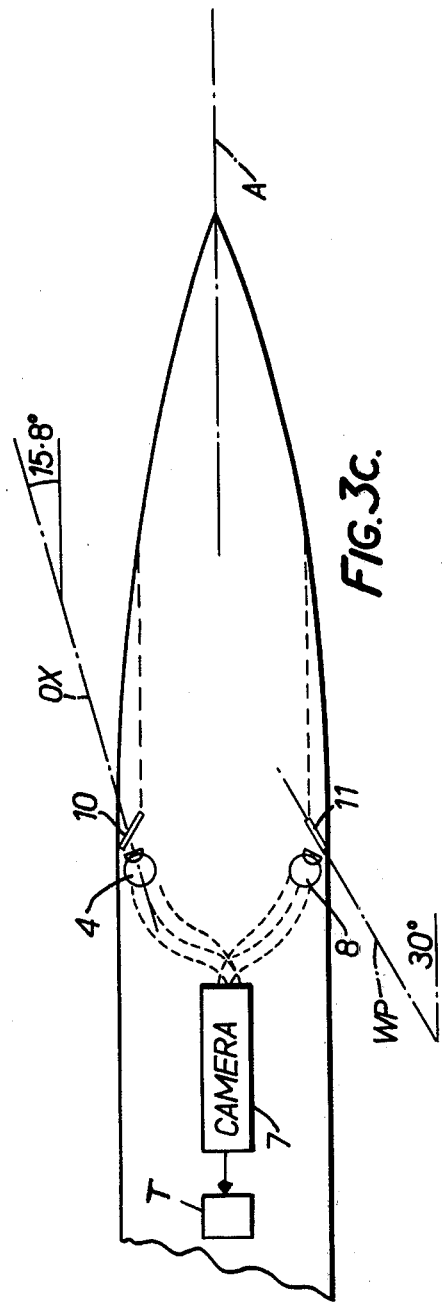
Figure 4:
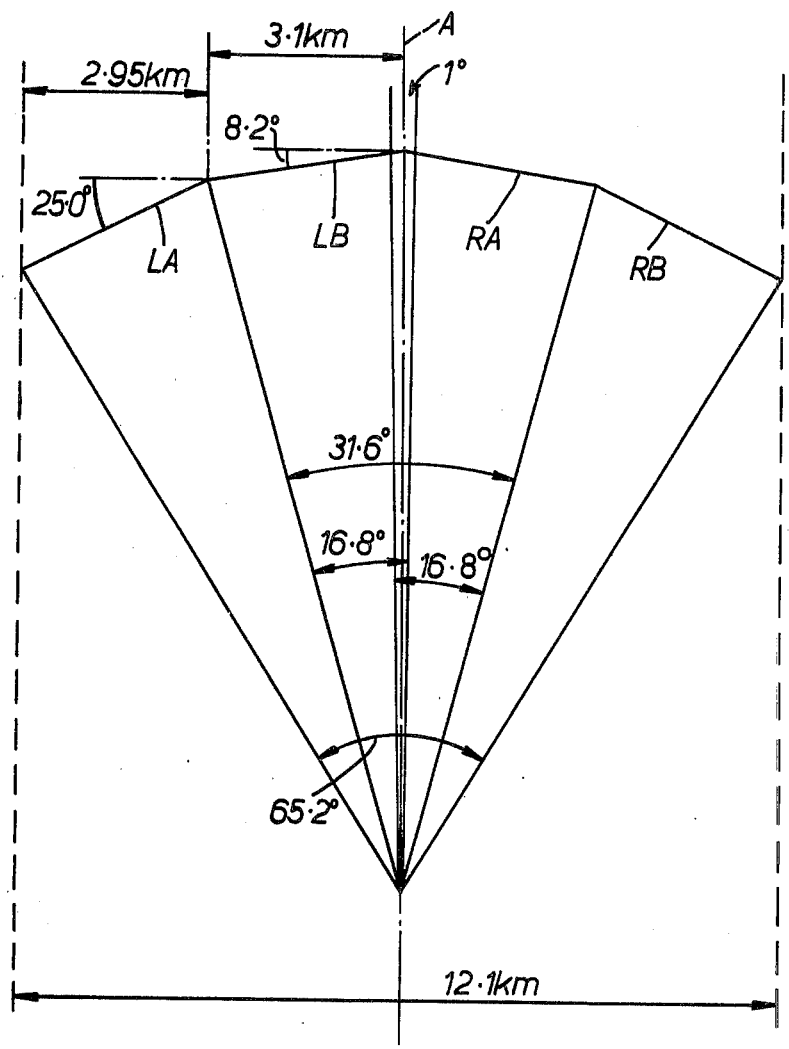
Figure 5:
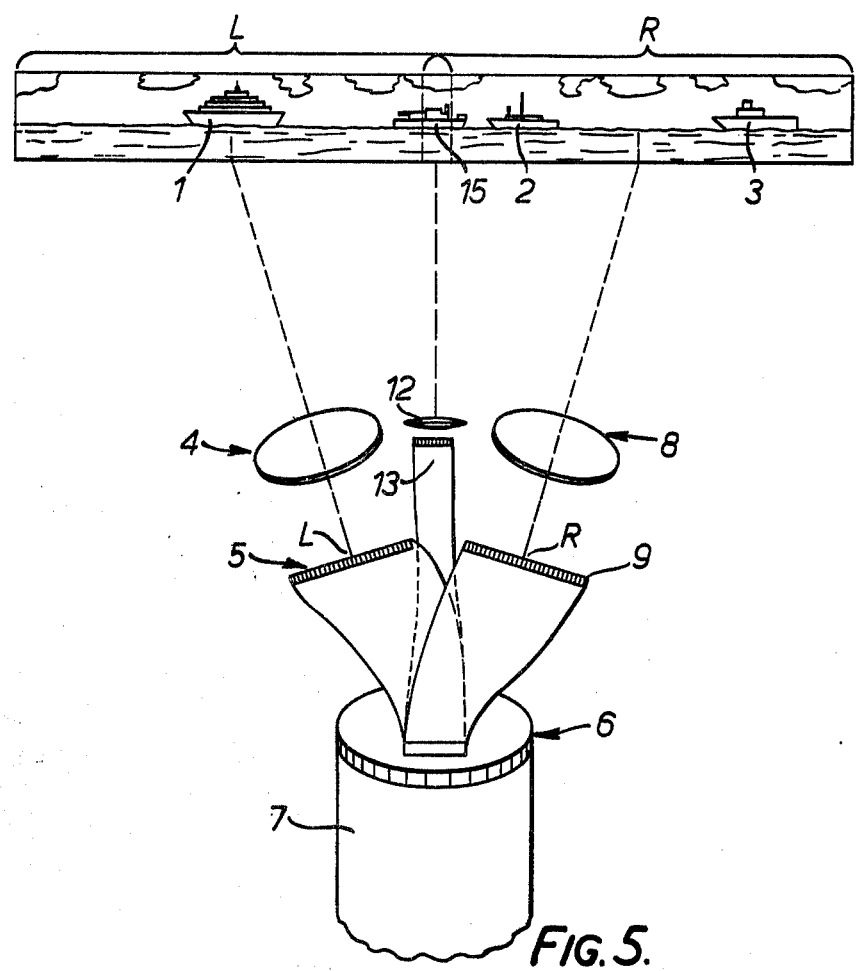
Figure 6:
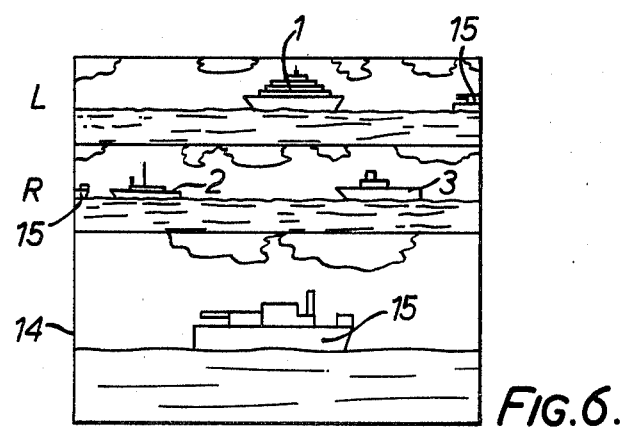
Figure 7B:
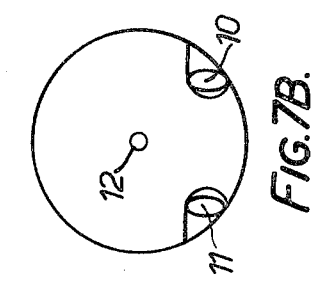
Figure 7A:
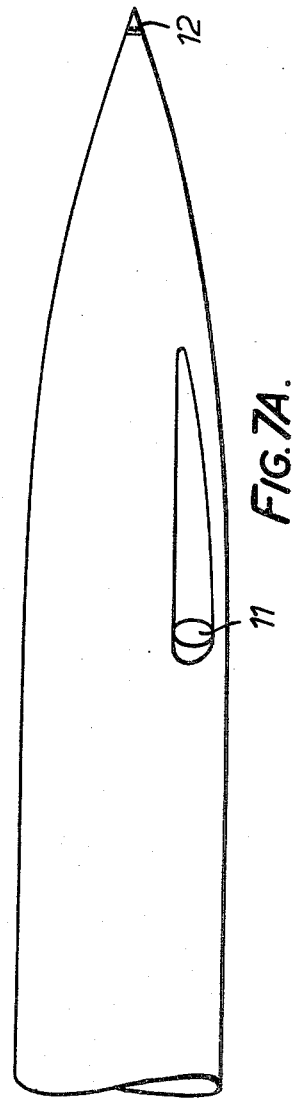
Figure 7C:
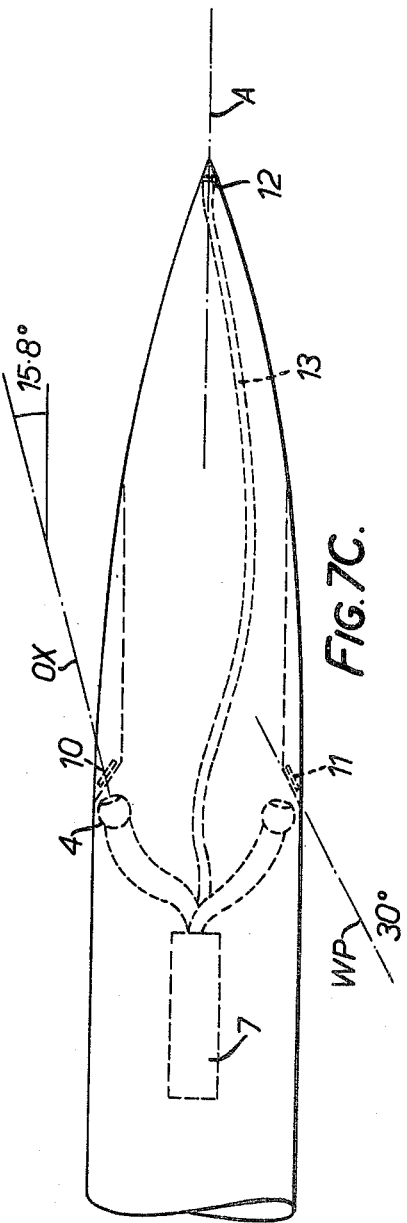

The invention is illustrated in and further described with reference to the accompanying drawings in which, FIG. 1 schematically illustrates the picture signal producing arrangement of a missile in accordance with the present invention, FIG. 2 in conjunction with FIG. 1, illustrates the effect provided by the present invention so far as an observer or controller is concerned, FIGS. 3A, 3B and 3C illustrate the mounting of the apparatus of FIG. 1 in a typical missile, FIG. 4 shows a plan view illustrating the relationship between the different fields of view involved in the present invention, FIG. 5 schematically illustrates the picture signal producing arrangement of a missile in accordance with the present invention, FIG. 6 in conjunction with FIG. 5 illustrates the effect provided by the present invention so far as an observer or controller is concerned and FIGS. 7A, 7B and 7C illustrate the mounting of the apparatus of FIG. 5 in a typical missile.

In all Figures, like references are used for like parts.

Referring to FIG. 1, it will be assumed that the missile is, in this example of the so called "seaskimmer" type provided to fly close to the surface of the sea, for example, between four and ten meters above the sea surface.

In the upper part of FIG. 1, a typical view of the region to which the missile is heading is shown as containing three vessels, 1, 2 and 3, whose superstructures are outlined against the horizon because of the low level at which the missile flies. The scene is divided into four portions LA, LB, RA and RB which are contiguous except for the inner fields of view LB and RA which overlap to a certain extent, as will be explained later. Fields of view LA and LB are focused by a lens system 4 situated on the left hand side of the missile on to the collecting ends of a first bifurcated fibre optic bundle 5. At this stage the views LA and LB will appear side by side. The two arms of the bifurcated bundle 5 separate the two views LA and LB and transmit these to a screen 6 formed by the fibre optic face plate of a camera tube 7. By virtue of the bifurcation of the fibre optic bundle 5 view LA is presented on the face plate 6 above view LB, as represented in FIG. 2.

For views RA and RB a lens system 8, similar to lens system 4, provided on the right hand side of the missile focuses view RA and RB on the collecting ends of a further bifurcated fibre optic bundle 9, which is similar to bifurcated fibre optic bundle 5, but is arranged to present views RA and RB in sequence beneath views LA and LB on the fibre optic face plate 6.

The camera 7 then scans the picture as shown in FIG. 2 provided on its fibre optic face plate 6 and the picture signals thus produced are transmitted to a base station in manner well known per se by the means T indicated generally in FIG. 3c.

As will be appreciated the present invention provides an operator or controller at the base station with a considerably increased view of the target region, in the horizontal plane, whilst at the same time maintaining good resolution. The camera tube is not required to be larger than the camera tube normally used in television missile guidance systems wherein the operator or controller is presented with a single field of view. A 1" vidicon is used in practice or, in the case of a system for night use, a 40 mm Ebsicon.

Referring to FIGS. 3A, 3B and 3C, FIG. 3A is a side elevation, FIG. 3B a head on view and FIG. 3C is a schematic plan view of the nose of a missile in accordance with the present invention.

As will be seen, the lens systems 4 and 8 are provided behind windows 10 and 11 respectively which are "suppressed" in the hull of the missile. The lens systems 4 and 8 each consist of an eyeball lens of 30 mm diameter, 50 mm focal length and $\phi$ equal to 70 mm. The optical axis OX of each system is inclined at 15.8° to the longitudinal axis A of the missile, whilst the windows behind which the lens systems are mounted lie in a plane WP inclined at 30° to the longitudinal axis of the missile.

Referring to FIG. 4, this illustrates the surface coverage of each field of view. Each field of view subtends an angle of 16.8° from its origin at the respective lens system, whilst the inner fields LB and RA of view, on either side of the longitudinal axis A of the missile overlapped by 1° to ensure continuous coverage over the total field of view.

Referring to FIG. 5, the apparatus is essentially similar to that illustrated in FIG. 1 except that the scene is divided not into two left hand portions LA and LB and two right hand portions RA and RB but into a single left hand portion L and a single right hand portion R and except for the addition of a centrally disposed lens system 12 providing a telescopic effect and having a relatively narrow field of view (2½°) in the horizontal field. The optical axis of the lens system 12 is aligned with the axis of the missile. A fibre optic bundle 13 is provided to collect light from the lens system 12 and transmit this to the screen 6 to form a view 14 beneath the views L and R which are arranged one above another. The effect of this is to provide in the view 14, when reproduced in the eventual television display, a magnified display of any targets directly ahead of the missile. Thus the vessel 15, which appears partly in both views L and R due to the overlap provided, can be examined in some detail by an operator by observing view 14. Thus an operator, having observed a target or likely interest in the general views provided by L and R can manoeuvre the missile to direct this towards the target, whilst at the same time having the benefit of a magnified view of the selected target in the view 14.

Referring to FIGS. 7A, 7B and 7C, these Figures are essentially similar to FIGS. 3A, 3B and 3C and merely show the addition of the lens system 12 and the additional fibre optic bundle 13. Whilst shown mounted in the nose of the missile (which is provided with a transparent portion) it would be possible to provide the lens system 12 in a protuberance on the nose of the missile or in a suppressed window like windows 10 and 11 provided in respect of the lens systems 4 and 8. The optical axis of the lens system 12 should, of course, be aligned with the axis A of the missile.

I claim:

1. A television missile guidance system comprising means for taking four different fields of view in the horizontal plane, and means for combining said fields of view to provide in a television display for an observer or missile controller, four corresponding views, one above another, two of said fields of view originating from one side of the missile and two from the other.

2. A system as claimed in claim 1 and wherein four fields of views are provided.

3. A system as claimed in claim 1 wherein said means for combining comprises a screen on which said fields of view are imaged one above another and a single television comera tube provided to view said screen to develop picture signals for transmission from the missile to base stations.

4. A television mission guidance system comprising means for taking four different fields of view in the horizontal plane, and means for combining said fields of view to provide in a television display for an observer or missile controller, four corresponding views, one above another, two of said fields of view originating from one side of the missile and two from the other.

5. A system as claimed in claim 4 and wherein the fields of view are contiguous except for the two inner fields of view originating from opposite sides of the missile which two inner fields of view overlap each other.

6. A system as claimed in claim 4 and wherein each field of view subtends an angle of between 10° and 20° in the horizontal plane and approximately 2° in the vertical plane.

7. A system as claimed in claim 4 and wherein said two inner fields of view overlap each other by at least one half of a degree.

8. A television missile guidance system comprising means for taking a plurality of different fields of view in the horizontal plane, and imaging means for combining said fields of view to provide in a television display for an observer or missile controller, a corresponding plurality of views, one above another, said imaging means comprising a screen on which said fields of view are imaged one above another and a single television camera provided to view said screen to develop picture signals for transmission from the missle to a base station, said imaging means also comprising two bifurcated fibre optic bundles, the first arranged to collect two fields of view side-by-side from one side of the missile and the second arranged to collect two fields of view side-by-side from the other side of the missile and both arranged to reproduce said fields of view one above another on a fibre optic face plate forming said screen viewed by said camera.

9. A system as claimed in claim 8 and wherein the fields of view on each side of the missile are provided by a lens system in the image plane of which is arranged the collecting ends of the respective fibre otic bundles.

10. A system as claimed in claim 9 and wherein said lens systems are situated behind suppressed windows provided in either side of the nose of the missile.

11. A television missile guidance system comprising means for taking a plurality of different fields of view in the horizontal plane, means for combining said fields of view to provide in a television display for an observer or missile controller, a corresponding plurality of views, one above another, and means for providing an enlarged image of part of the display, selectable for example when a target has been chosen.

12. A system as claimed in claim 11 and wherein said means are such as to increase the scale of the television display over a selected portion thereof.

13. A system of claimed in claim 11 and wherein said means are such as to effect a reduction in the field of view to provide a telescopic effect thereby effectively enlarging the image of the chosen target.

14. A television missile guidance system comprising means for taking a plurality of different fields of view in the horizontal plane and a further, relatively narrow field of view in a direction aligned with the axis of said missile, and means for combining said further field of view and said plurality of different fields of view to provide in a television display for an observer or missile controller, said plurality of views, one above another, and said further field of view adjacent said plurality of views.

15. A system as claimed in claim 14 and wherein said last mentioned view, as displayed, is magnified compared with said first mentioned plurality of views.

16. A system as claimed in claim 14 and wherein said last mentioned view is displayed beneath said first mentioned plurality of views.

17. A system as claimed in claim 14 and wherein said relatively narrow field of view subtands an angle of $2\frac{1}{2}°$ in the horizontal plane.

18. A system as claimed in claim 14 and wherein a fibre optic bundle is utilised to collect light from a centrally disposed lens system providing said relatively narrow field of view and transmit said collected light to said screen.

19. A system as claimed in claim 18 and wherein said last mentioned lens system is provided to have a telescopic effect.

20. The method of displaying target information to an observer or missile controller, which comprises the steps of:

(a) optically generating left and right fields of view with respect to the axis of a missile, said fields of view overlapping at said axis;

(b) transferring said views upon a television camera tube so that one field of view is disposed above the other and transmitting said fields of view in such orientation; and (c) displaying said fields of view, one above the other, to an observer or missile controller whereby two separate fields of view are observed, each of which contains visual information concerning the axial heading of the missile.

21. A television missile guidance system wherein means are provided for taking a plurality of different fields of view in the horizontal plane ahead of a missile at least one of said plurality of different fields of view originating from one side of the missile and another of said plurality of different fields of view originating from the other side of said missile and means for provided for combining said plurality of different fields of view to provide in a television display for an observer or missile controller a corresponding plurality of views one above another.

22. A missile-carried guidance system comprising, in combination:

a television camera and means for transmitting the scene viewed by said camera to a base station for observation of that scene by an observer or missile controller; and means for generating said scene, comprising means for imaging a plurality of different fields of view in a horizontal plane ahead of the missile one above another to form at least part of said scene.

23. A guidance system as defined in claim 22 wherein there are at least two of said different fields of view, one of which is taken to one side of the missile axis and the other of which is taken to the other side of the missile axis.

24. A guidance system as defined in claim 23 wherein said two fields of view overlap.

25. A guidance system as defined in claim 22 including further means for taking a narrow field of view directing ahead of the missile and which overlaps two of said different fields of view, said means for imaging operating to image said narrow field of view separately in said scene.

26. A guidance system as defined in claim 25 wherein there are at least two of said different fields of view, one of which is taken to one side of the missile axis and the other of which is taken to the other side of the missile axis.

27. A guidance system as defined in claim 26 wherein said two fields of view overlap.

* * * * *